United States Patent [19]

Markus

[11] 3,898,968
[45] Aug. 12, 1975

[54] THERMO INSULATED HYDRAULIC RESTRICTORS

[76] Inventor: Isidoro N. Markus, 65-36 99th St., Rego Park, N.Y. 11374

[22] Filed: Nov. 2, 1973

[21] Appl. No.: 412,285

Related U.S. Application Data

[63] Continuation of Ser. No. 383,067, July 27, 1973.

[52] U.S. Cl. ............... 123/122 E; 123/141; 165/52
[51] Int. Cl. ............................................. F22b 9/06
[58] Field of Search ........ 123/122 E, 122 H, 122 R, 123/141; 126/247; 138/40, 42; 48/180 R, 180 H; 165/52

[56] References Cited
UNITED STATES PATENTS 3,813,036  5/1974  Lutz ..................................... 122/26

FOREIGN PATENTS OR APPLICATIONS 15,357  10/1897  Switzerland .......................... 138/42
236,876  7/1911  Germany ............................... 138/42
86,345  1/1921  Switzerland .......................... 138/42

*Primary Examiner*—Charles J. Myhre
*Assistant Examiner*—R. H. Lazarus
*Attorney, Agent, or Firm*—Bauer & Amer

[57]  ABSTRACT

In an internal combustion engine working a fuel injection combustion process, the fuel is heated by pumping it through thermo insulated hydraulic restrictors.

12 Claims, 5 Drawing Figures fuel spray

THERMO INSULATED HYDRAULIC RESTRICTORS

BACKGROUND OF THE INVENTION

This application is a continuation of my copending application Ser. No. 383,067, entitled "Thermodynamic cycle for rotary engines", filed July 27, 1973.

The present invention is directed to any type of an internal combustion engine working in the ignition compression cycle, wherein it is impractical, if not impossible, to reach an air compression high enough to assure the ignition of the injected fuel.

More particularly, it relates to a compression ignition like combustion process of the fuel injected type, in which fuel is burned in an excess of air, and where the internal combustion engine is of the rotary type, namely the Wankel.

Engineering studies, research, and production of the Wankel engines proves that, any given horsepower could be delivered by this rotary engine design in less space, weight and cost than in any other existing engine. Up to now, all efforts have been dedicated to the development and production of Wankel engines working on the Otto cycle, this means of the spark-ignition type, where the bulk of the commercial demand exist.

Nevertheless, an intense effort is also directed on using the Wankel engine in a Diesel cycle, this is of the compression-ignition type.

The advantages of a Diesel-Wankel engine will be multiple since a regular Diesel is more economical to operate, and is also more reliable; the Diesel drawbacks being initial cost, volume and weight. Thus a Diesel-Wankel engine would combine the lower cost, volume and weight inherent in the Wankel design with the high efficiency and reliability of the Diesel cycle.

But expectancy of a similar success, as a compression ignition engine, failed to materialize because of the difficulty in obtaining a high enough compression ratio. Most of the gasoline Wankel engines are working with a 9:1 compression ratio, and an increase in the compression would produce an unacceptable shallow, and elongated combustion chamber, with a high surface to volume ratio at top dead center, therefore cooling the compressed air, and quenching the combustion process.

If the compression ignition cycle is changed, as it was stated in my copending application, we could run a Wankel engine having a compressed air temperature below the fuel ignition temperature (low compression ratio) assuming the injected fuel has a temperature above its fuel ignition temperature.

Having described, in my copending application, the thermodynamic process of the invention, I am now describing some of the components that will make this invention possible.

As it was stated in my copending application, I am relying on thermo insulated hydraulic restrictors (t.i.h.r.) to rise the fuel temperature.

An hydraulic restrictor is a static device that produces a fluid pressure drop simultaneously with a system temperature gain. In other words: the hydraulic restrictor is converting the mechanical energy, spent in pumping the fluid, into thermic energy that will rise said fluid temperature.

To that end, the fuel to be heated is pumped through very long and small conduits, named fuel paths, where by friction, mainly with the conduit walls, and by eddy losses, will generate friction heat that will be absorbed by the fuel.

Care has to be taken, that this fuel temperature gain, is not dissipated by induction and/or convection. To this end, the means that are used in the heating, pumping and injecting of the hot fuel should be thermo insulated, in order to reduce heat losses.

By using a piece of ceramic (having cast or machined fuel paths) as an hydraulic restrictor, we achieve a good balance of design simplicity and heat insulation, ideal for the purpose of heating a fuel efficiently.

The development of a t.i.h.r. would be impossible without the use of ceramics, since no other material is so suited for abrasion resistence, producing very smooth fuel paths when cast, and having high heat insulation coefficients.

Furthermore, ceramics are very inexpensive and available materials, and their manufacturing processes are well understood.

The amount of energy necessary for a 1°C increase in the temperature of 1 gram of fuel having a specific heat of 0.5 is 0.2136 kilogram-meter. In order to achieve a temperature increase of 280°C (very common), a theoretical hydraulic pressure drop of 65,000 lb/sq.in. must be achieved in the t.i.h.r.. Since this is, for today's technology, a very high pressure, means had to be developed to reduce this pressure by heating the fuel in cascades. The advantages are obvious. In a fuel layout where a t.i.h.r. is placed before the injection pump, the injection pump will work with fuel having a temperature of at least 300°C; this will not only deteriorate the pump, but, also, impose unacceptable heat losses.

To avoid this condition, one of the embodiments of the patent is the ability of raising the fuel temperature in the fuel injector body itself.

To that end, the cold fuel is metered, and pumped, by the injector pump, but instead of having a regular all metalic fuel injector body, we have an open end fuel injector made of ceramic. If we have fuel paths cast, or machined, thereinto said ceramic body, any head pressure drop will raise, accordingly, the fuel temperature. The remaining hydraulic pressure will be used to inject the now heated fuel into the engine combustion chamber.

In practice, it will be more realistic to have the injection pump work with a lukewarm fuel (160°–200°C), in order to reduce the necessary hydraulic pressure to about 25,000 lb/sq.in.

The need of using an open end injector become imperious, since no fuel injector valve would work with fuel at 300°C.

The open end ceramic fuel injector has no moving parts, and any fuel dripping could be avoided by having small injection holes that would require an enormous hydraulic pressure drop, that by the same token, would build up the fuel temperature.

Although some of the exhaust gases heat could be used for raising the fuel temperature, since it is much higher than the injected fuel temperature, we can not take full advantage of it, because this will mean an injector pump working with a 300°C fuel; therefore, the maximum temperature that could be extracted from the exhaust gases, is given by the maximum continuous temperature that the fuel injecting pump could endure. The difference in temperature between the injected fuel and that provided by the exhaust gases must be raised in a t.i.h.r., that, as it was stated, could be raised outside the fuel injector and/or in the fuel injector itself, depending on the temperature increase desired, and the type and flow of fuel needed.

SUMMARY OF THE INVENTION

A primary object of the invention, therefore, is to operate a rotary internal combustion engine of the Wankel type, with an injected fuel combustion process, whereby fuel is ignited and burned efficiently, in an excess of air compressed to a temperature below said fuel ignition temperature and, whereby, the fuel is injected at a temperature above said fuel ignition temperature.

Another object of the invention is to heat the fuel, in the most efficient and quickest way, by pumping it through heat insulated fuel conduits where it will develop, mainly by friction with the conduit walls, enough heat to reach, and surpass, its fuel ignition temperature.

Still another object of the invention, describes the different embodiments possible in the design of heat insulated hydraulic restrictors.

It is an additional object of this invention to provide an arrangement for heating the fuel, by using heat wasted in the exhaust gases.

A further object of the present invention is the way of manufacturing a thermo insulated hydraulic restrictor working as an open end fuel injector, and having a precombustion chamber.

A still further object of the present invention are means to heat the fuel, and related fuel system components, prior to cranking the engine.

A most important object of the invention is to demostrate the importance in building all types of t.i.h.r. in ceramic materials.

DESCRIPTION OF THE PREFERRED EMBODIMENT

To assure a prompt and simple cold engine cranking operation, it is very important that the injected fuel temperature be as high as possible. The fuel that is not up to its right temperature must be diverted for recycling, before any intent of starting the engine is attempted. To this effect, a branch-off in the fuel injector, leads the incoming fuel into a temperature valve, to evaluate the fuel temperature. If the fuel temperature is low, the fuel bypasses the injector nozzle and is recycled through the engine t.i.h.r. and fuel injector until it reaches the correct temperature; in sensing the correct temperature, the temperature sensing valve closes the bypass (branch-off), forcing the incoming fuel to be injected into the engine combustion chamber.

The reason for the branch-off is, then, to allow the flushing of all the "cold" fuel existent between the t.i.h.r. and the fuel injector nozzle, prior to cranking the engine. Otherwise (without the branch-off), the engine will be flooded with an unburnable cold fuel during each starting attempt.

Once the engine starts, the branch-off is definitely shut off, independently of the temperature of the fuel that reaches the nozzle.

Figure 1:
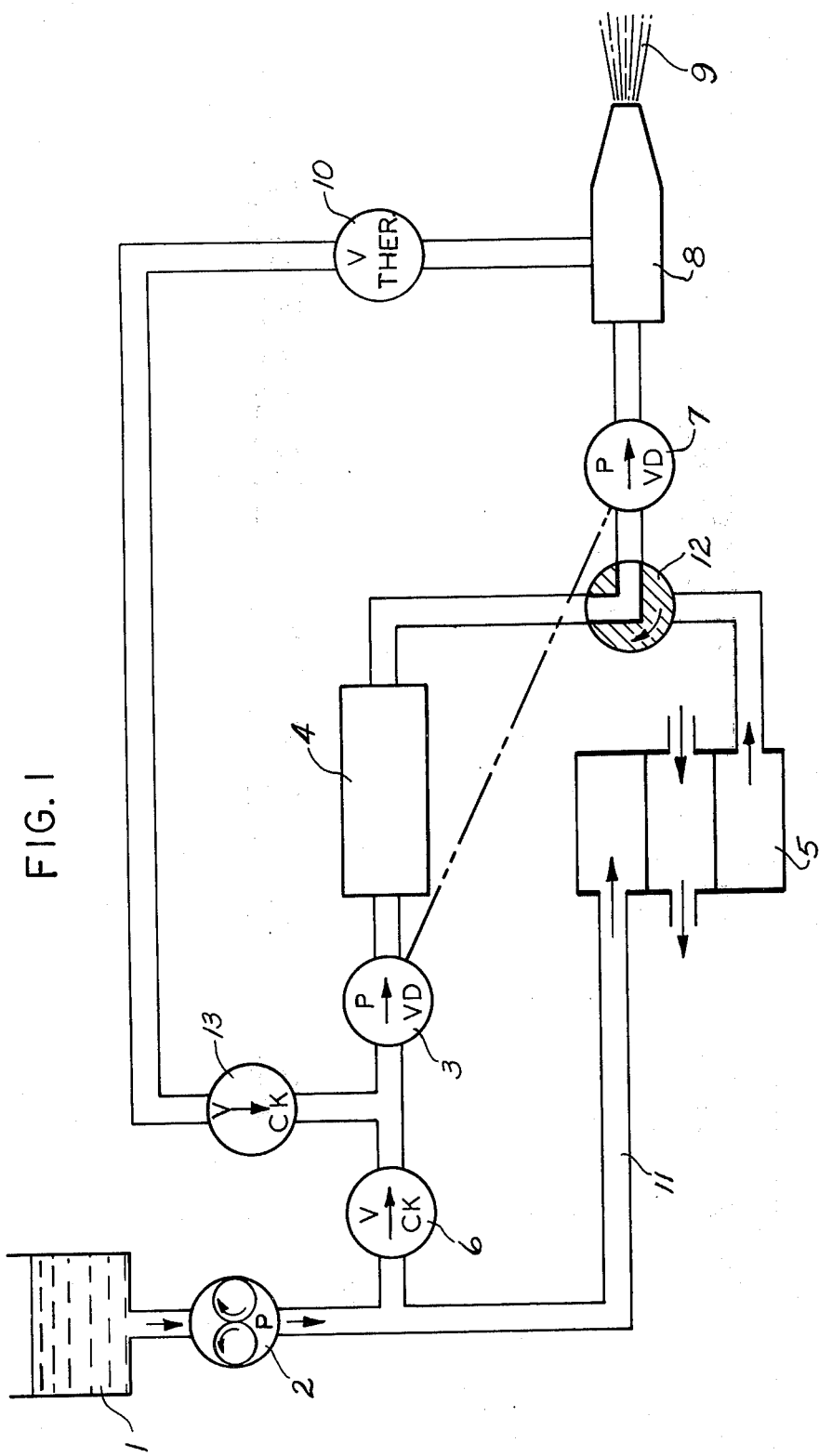
FIG. 1 is a schematic layout of a fuel heating system.

FIG. 1 is the layout of an internal combustion engine fuel injection system, having means for heating said fuel.

Here, fuel tank 1 has a gear pump 2 to feed a variable pressure pump 3; 6 is a check valve; the high pressure fuel flows through the t.i.h.r. 4; 12 is a two way valve; from there the fuel is metered and pumped by the fuel injector pump 7 (variable volume type), and trough the t.i.h.r. injector, 8, thereinto the engine combustion chamber; 9 is the fuel spray.

During the pre-cranking procedure, when the fuel almost reaching the nozzle of the injector 8, is below a certain temperature, the fuel is diverted by a temperature sensor, valve 10, through check valve 13, to the variable pressure pump 3 for a new cycle, until the fuel reaches the right temperature. On reaching the predetermined temperature, valve 10 initiates the engine starting procedure by closing the branch-off, therefore forcing the now hot fuel, to be injected into the combustion chamber.

Since all the metallic and ceramic components, that contribute to raise the fuel temperature, are then (cold engine condition) at a very low temperature, it is a feature of this invention that the fuel pumps involved in the process be activated prior, and independently, of the main engine motions. This is, fuel pump 3 and fuel injection pump 7, on FIG. 1, are activated by a common axle, that is then disengaged from the engine and driven by auxiliary means, like batteries, compressed air, steam, another engine, etc.

The fuel will then be heated as explained, heating up all the fuel system components in the process, by being continuously recycled. When the fuel reaches a preestablished temperature, controlled by thermostatic valve 10, the pumps 3 and 7 are engaged, again, to the engine. In this maneuver, fuel injection pump 7 (at least) must be synchronized (timely engaged) with the engine, before any engine cranking is attempted.

Figure 2:
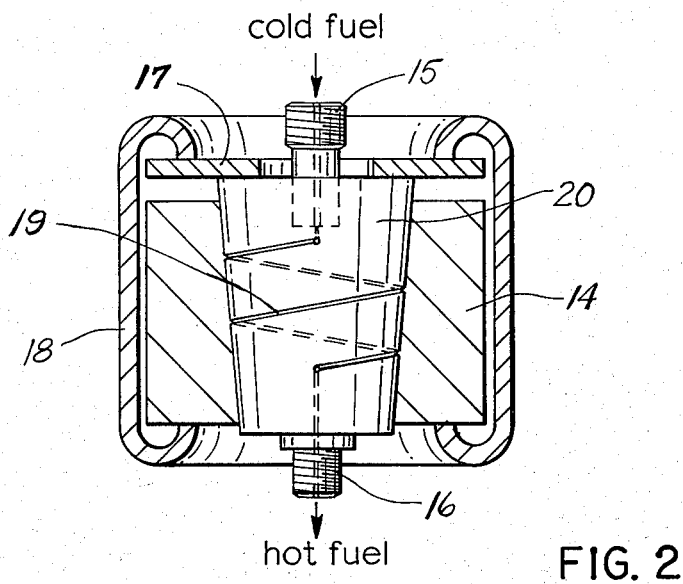
FIG. 2 represents an elevation cross section of a t.i.h.r..

When the engine reaches the working temperature, most of the energy spent in heating the fuel may be saved by using the exhaust gases energy for pre-heating the fuel. In this case, fuel line 11 bypassing the first heating stage, gets to heat exchanger 5, thru the two way valve 12, to the fuel injector pump 7 and, finally, to injector 8. FIG. 2 is a cross section of a t.i.h.r.. It consist of a ceramic outer core 14, a ceramic inner core 20, a cold fuel inlet nipple 15 cast into inner core 20, a hot fuel outlet nipple 16 brazed to inner core 20.

Outer core 14 and inner core 20 have mating frusto conical faces; over any of said faces a small canal is machined, or cast, that will hydraulically connect the fuel inlet 15 with the fuel outlet 16; this canal becomes the fuel path.

Due to the high pressures imparted upon the fuel, means are provided to keep both ceramic cores in a leak proof engagement. One preferred embodiment would have an elastic washer 17 and the metallic sleeve 18. Sleeve 18 may be removed to service the unit.

For drawing clearness, only one fuel path, 19, is shown describing a spiral, but the fuel path(s) could be multiple and complex, their number and length given by the temperature, amount and type of fuel to be heated.

Figure 3:
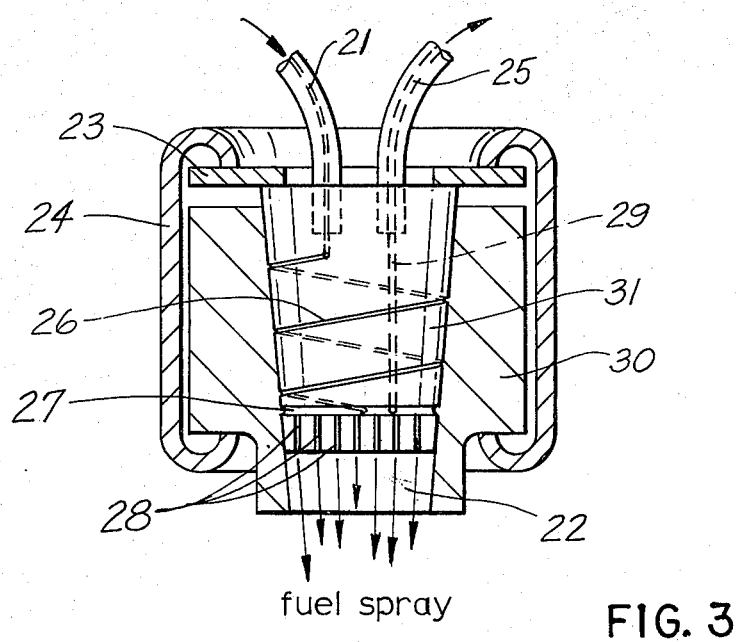
FIG. 3 depicts an elevation cross section of a t.i.h.r. working as an open end fuel injector and having a precombustion chamber.

FIG. 3 is still another embodiment of a t.i.h.r., but working as an open injector, this is: no plunger valve in the nozzle.

It consist of a ceramic outer core 30 and a ceramic inner core 31. Two pipes are attached to inner core 31: cold fuel inlet pipe 21, and the branch-off pipe 25. Outer core 30 and inner core 31, have mating frusto conical faces that are kept together by means of a washer 23, and a metallic sleeve 24.

Inner core 31 is deeply recessed into uter core 30, creating a cavity 22, known as a precombustion chamber. This combustion chamber 22, may be placed at either end of the frusto conical cores, depending if the design calls for a convergent or divergent fuel spray. This one shown, produces a converging spray.

Fuel paths engraved, or cast, onto the mating cores faces conducts the fuel from the inlet pipe 21 to the precombustion chamber 22. For drawing clearness, only one fuel path, 26, is shown conducting the fuel from the inlet pipe 21 to a fuel manifold ring 27; from ring 27 to the precombustion chamber 22, a couple of fuel paths 28 are shown. The branch-off consists of an inner conduit 29, that connects ring 27 with branch-off pipe 25. When the temperature sensor valve (not shown) at the end of pipe 25 closes, the highly pressurized fuel is forced into the precombustion chamber 22.

Figure 4:
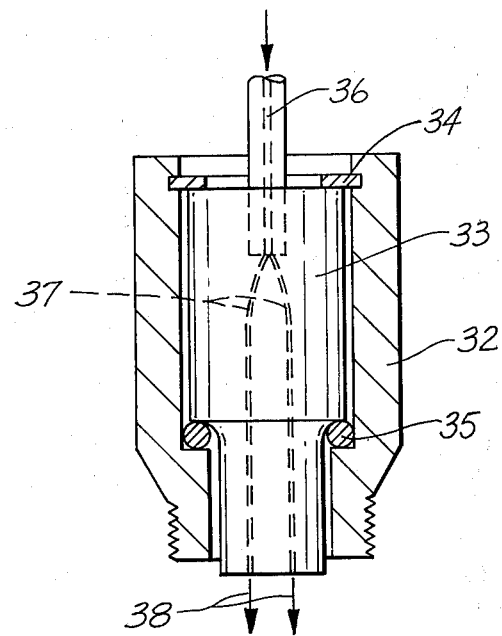
FIG. 4 illustrates an elevation cross section of a t.i.h.r. working as an open end fuel injector.

FIG. 4 is another embodiment of a t.i.h.r. working as an open end fuel injector. Here, 32 is a metallic casing for attaching the unit to the engine. 33 is the ceramic body of the t.i.h.r., attached thereinto casing 32 by the 0 ring 35 and the elastic ring 34; cast into the ceramic body 33 is the fuel inlet pipe 36.

Depicted in phantom lines, 37, are two fuel paths; 38 is the fuel spray emerging from said paths.

This embodiment represents an economical approach to a t.i.h.r. working as a fuel injector. It lacks a branch-off that will avoid cold fuel flooding when starting the engine, but, for very small and inexpensive engines, or for power plant engines that seldom stop running, or for engines working in hot enviroments, where cold startings are unknow, this design provides a cheap and simple injector, that will inject fuel already hot, or heat a cold fuel, that comes thru pipe 36.

Figure 5:
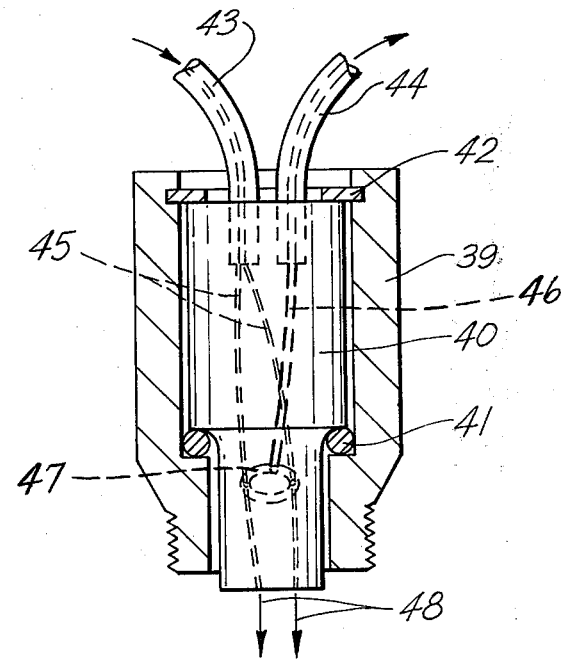
FIG. 5 presents a cross sectional view of a t.i.h.r. working as an open end injector.

FIG. 5 is another embodiment of a t.i.h.r. working as an open end fuel injector.

Here, 39 is a metallic casing for attaching the unit to the engine. 40 is the ceramic body of the t.i.h.r., attached thereinto casing 39 by the 0 ring 41 and the elastic ring 42.

Cast into the ceramic body 40 are inlet fuel pipe 43 and the branch-off pipe 44; 48 is the fuel spray.

Depicted in phantom lines are tow fuel paths 45; 47 is a manifold that, having a greater diameter interconnects all the fuel paths just short of the injector nozzle. This manifold, 47, is hydraulically connected to the branch-off pipe 44 by the conduit 46, also having a generous diameter.

Any pressurized fuel coming thru the inlet pipe 43 is forced through the fuel paths 45 where, by friction with the fuel paths walls, and/or eddy losses, builds up (the fuel) its temperature. If a less resistance path(s) is possible, namely: manifold 47, conduit 46 and branch-off pipe 44, the fuel will follow it, instead of forcing itself thereinto the injector nozzle.

As it was explained in FIG. 1, at the end of pipe 44, a thermostatic valve, like No. 10 in FIG. 1, will control the temperature of the fuel coming out of the branch-off pipe 44, and when it reaches a preestablished temperature, the branch-off is closed, forcing the fuel to go thru the injector nozzle.

This embodiment, FIG. 5, is then, a t.i.h.r. working as an open end fuel injector and having a branch-off fuel pipe. A precombustion chamber (not shown) could be added, by recessing part of the ceramic nozzle.

Having described to some degree, the fuel heating layout and the different t.i.h.r. embodiments, it will be easier to understand the monitoring of the injected fuel temperature.

The amount of temperature rise in a t.i.h.r. is proportional to the hydraulic pressure drop that the fuel experiences thereinto said t.i.h.r.; therefore, knowing the temperature, the pressure and the viscosity of the fuel prior to enter any t.i.h.r., and establishing the temperature and the pressure at which the fuel should leave said t.i.h.r., it is very simple to determine the pressure that this fuel should be subject to, by available pumps, preferably, of the variable pressure type, e.g., in FIG. 1, fuel injector 8 is a t.i.h.r. working as an open end fuel injector, and since it has a branch-off outlet pipe, it will be a fuel injector of the type described in FIG. 3 or FIG. 5.

Here, the injected fuel temperature could be determined by the measured temperature of the fuel reaching the temperature sensor valve 10. And, since there is a linear relationship between the measured temperature and the fuel pressure, pressurized by the fuel injector pump 7, any logic circuit that monitors the engine parameter's, will, automatically, increase the fuel pressure when the temperature is low, and viceversa, will reduce the fuel pressure when the fuel temperature is higher than required. Fuel injection pump 7 is, typically, a variable volume pump, but it should also have means to regulate its pressure.

But, the temperature of the fuel going out a t.i.h.r. may also be determined by the parameters of the fuel entering said t.i.h.r., assuming we know the hydraulic pressure drop that this fuel is subject to, thereinto said t.i.h.r..

If, in FIG. 1, injector 8 where of the type described in FIG. 4, this is, not having a branch-off pipe outlet; the temperature, the viscosity and the pressure of the fuel will be measured before it reaches the injector, and the logic circuit that monitors the engine parameter's would determine, accordingly, the pressure settings of the fuel injector pump 7.

In the cold engine starting procedure, if the temperature, the pressure and/or the viscosity of the fuel reaching the injector, is below certain preestablished values, the fuel must be recycled, in which case the branch-off of the fuel is made before it enters the fuel injector described in FIG. 4. This means -still in FIG. 1- that the temperature sensor, valve 10, will be placed in connection with the injector fuel inlet pipe 36.

Although the fuel temperature is the most important variable, the injector's branch-off means may, also, be used to measure the fuel pressure and viscosity values.

The determination of the fuel viscosity is important, mostly, in engines having multifuel capability.

Having now described my invention what I claim as new and desire to secure by Letters Patent is:

1. In an internal combustion engine having at least a combustion chamber,
   a supply of fuel,
   a fuel injector for injecting fuel from said supply into said engine combustion chamber at a preheated temperature,
   a fuel pump between said supply and fuel injector to pressurize the flow of fuel from the supply to the combustion chamber through said injector,
   said fuel injector comprising a ceramic thermoinsulated hydraulic restrictor block having cold fuel inlet means and hot fuel outlet means,
   a constricted passageway defined in said ceramic block hydraulically connecting said fuel inlet means to said fuel outlet means,
   a sleeve coupled about a peripheral portion of said ceramic block to connect the same to the engine combustion chamber,
   said fuel pumped under pressure along said constricted passageway by said fuel pump frictionally increasing its temperature to preheat the same prior to its injection into said engine combustion chamber,
   and said fuel outlet means having fuel injection holes located to inject the increased temperature fuel directly into the engine combustion chamber.

2. In an internal combustion engine as in claim 1,
   said ceramic passageway comprising a single fuel channel having an inlet at one end thereof and a plurality of outlets at the other end thereof with said inlet and outlets in communication within said passageway.

3. In an internal combustion engine as in claim 2,
   a return path connected with at least one of said plurality of outlets to divert part of the heated fuel back to said inlet for recirculation through said passageway.

4. In an internal combustion engine having at least a combustion chamber,
   a thermoinsulated hydraulic restrictor adapted to raise the temperature of a fuel flowing under pressure therethrough and for injection of the fuel directly into the internal combustion engine chamber comprising
   a restrictor member,
   fuel path means defined through said member and through which said fuel flows,
   input means in communication with said fuel path means,
   and output means coupled to said fuel path means such that as the fuel is driven under pressure through said fuel path means, the heat of friction caused by the fuel flowing against the walls of said path means heats the fuel, said output means being connected with said combustion chamber and injecting the heated fuel directly thereinto.

5. In an internal combustion engine as in claim 4,
   said member comprising an inner core and an outer core,
   said cores having mating frusto-conical faces with said fuel path means defined between said faces.

6. In an internal combustion engine as in claim 5,
   a sleeve coupled about a peripheral portion of said cores to hold the same in mating engagement.

7. In an internal combustion engine as in claim 6,
   each of said cores having opposed bases,
   said inner core being recessed from one of the bases of said outer core thereby defining a precombustion chamber before said output means and in communication with said fuel path means.

8. In an internal combustion engine as in claim 4,
   said path means comprising a manifold ring and a recirculation conduit coupled to said ring selectively to tap the fuel from said ring and recirculate the fuel into said path means when the fuel is below its ignition temperature.

9. In an internal combustion engine as in claim 8,
   valve means coupled across said conduit selectively to block the fuel flow therethrough,
   means to monitor the temperature of the fuel being recirculated through said conduit such that when the fuel reaches its ignition temperature, said temperature monitoring means causes said valve means to block the fuel flow through said conduit.

10. The combination of a fuel injector with an internal combustion engine having a combustion chamber, said combination comprising
    an element of low thermoconductivity,
    fluid flow restrictor means defined in and extending through said element and having fuel input and output means,
    and means for demountably attaching said element output means to said engine combustion chamber whereby as fuel is caused to flow through said restrictor means the frictional heat generated during such flow causes the fuel to rise to a temperature in excess of its ignition temperature and the heated fuel is injected from said outlet means directly into said combustion chamber.

11. The combination as in claim 10,
    said demounting means including a sleeve partially disposed about said element,
    and means on the periphery of said sleeve to connect the last mentioned element to an engine.

12. The combination as in claim 10,
    said restrictor means including a manifold fluidly coupled thereto between said input and output thereof,
    a tap in communication with said manifold and in conjunction therewith to present a path of least resistance for the fuel selectively to siphon the fuel from said manifold to recirculate the fuel through said restrictor means when the fuel is below its ignition temperature.

* * * * *